United States Patent [19]

Lawson

[11] Patent Number: 4,475,422
[45] Date of Patent: Oct. 9, 1984

[54] METHOD OF SLITTING OR EDGE TRIMMING STRIP MATERIAL

[75] Inventor: Kenneth T. Lawson, Stokesley, England

[73] Assignee: Davy McKee (Poole) Ltd., Poole, England

[21] Appl. No.: 469,978

[22] Filed: Feb. 25, 1983

[30] Foreign Application Priority Data

Feb. 26, 1982 [GB] United Kingdom ............... 8205668

[51] Int. Cl.$^3$ ............................................. B23D 19/06
[52] U.S. Cl. .......................................... 83/13; 83/71; 83/368; 83/428
[58] Field of Search ...................... 83/13, 71, 368, 428

[56] References Cited

U.S. PATENT DOCUMENTS 4,239,072 12/1980 Meriläinen ........................ 83/368 X
4,283,976 8/1981 Wennerström ................... 83/428 X
4,358,978 11/1982 Lawson ............................. 83/368 X Primary Examiner—Frank T. Yost
Attorney, Agent, or Firm—Lee, Smith & Zickert

[57] ABSTRACT

A method and device for slitting or edge trimming strip material on a process line are described in which trimming knives 2 mounted on a base 3 which is pivotally mounted on a sub-base 4, trim the edges of strip 14. The lateral position of the strip is sensed by sensors 10 and the position of the strip relative to center line of the process line is determined by a computer (not shown) which controls the lateral movement of the sub-base 4 by a hydraulic jack 9 so as to keep the strip and trimmer in alignment. The speed V of the strip is sensed and the speed $V_T$ of the trimmer is sensed by a transducer 12. The base 3 and thus each pair of knives 2 is pivoted about a pivot 11 on the sub-base 4 so that the angle $\alpha$ the knives make with the center line of the process, tends to equal $\tan^{-1}(V_T/V)$.

6 Claims, 7 Drawing Figures

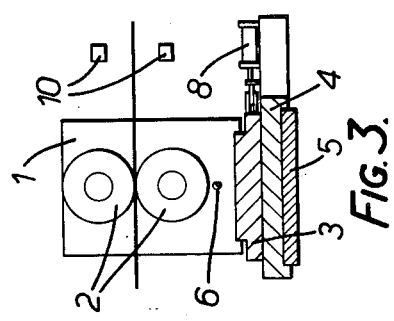
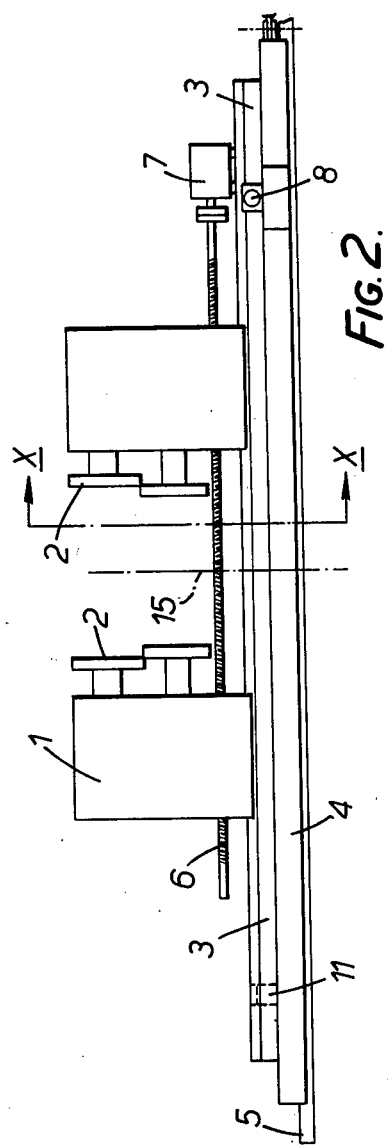
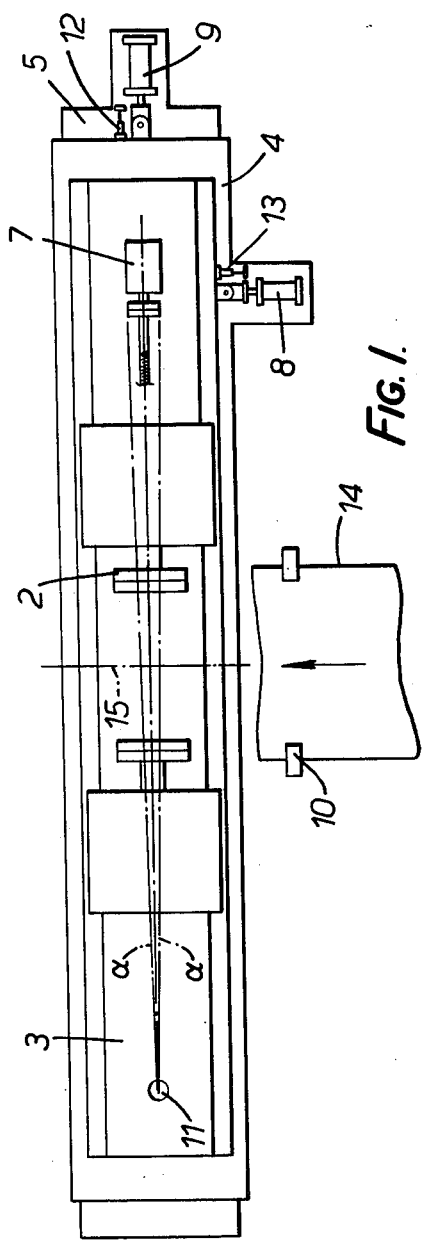

METHOD OF SLITTING OR EDGE TRIMMING STRIP MATERIAL

FIELD OF THE INVENTION

This invention relates to a method of slitting or edge trimming the edges of a moving strip of material such as steel strip, tin plate and the like.

BRIEF DESCRIPTION OF THE PRIOR ART

In our UK patent application No. 8020703 (published as No. 2050915A) a number of edge trimming devices are disclosed. In the embodiment disclosed in FIG. 1 of that patent specification knives are shown which are mounted on links so that they are free to pivot as the trimmer moves transversely to the strip. The knives are arranged so that they freely steer themselves across the strip.

In FIGS. 6 and 7 of the above specification a trimmer device is shown in which spaced sets of trimmer knives are mounted on trimmer heads attached to a sub-base and the sub-base is in turn pivoted centrally on a laterally slidable base. The sub-base, and therefore the trimmer knives, may be pivoted by means of a hydraulic jack acting on a cantilevered arm, but the only means described in the specification for controlling the angles of the knives is by comparing the position of the strip edges and the position of the trimmer and from this comparison deriving a signal which is used to pivot the trimmer and the resulting sideways forces on the knives then cause it to move so as to keep in line with the strip; however if the trimmer is heavy then frictional resistance may prevent it from moving into line with the strip.

We have now developed an alternative method of aligning the trimmer which is more positive in action in that the pivotting of the knives, and their lateral position, is directly controlled by separate actuators in such a way that the angle of each knife is correctly controlled to suit both strip speed and the instantaneous lateral speed of the trimmer.

The present process is applicable not only to strip trimmers of the kind disclosed in FIGS. 6 and 7 of our published specification but also to other designs of trimmers known in themselves, which carry two pairs of knives in a rotating head and in which, whilst one pair of knives are in operation trimming the strip, the other pair is turned away in ambush so that the knives can be replaced and maintenance can be carried out on the standby knives.

This type of trimmer head is complicated and it does not lend itself easily to the method of steering and maintaining the trimmer in line with the strip as described in our earlier specification.

The method of this invention is applicable equally to trimmer heads carrying undriven knives and those in which the knives are driven.

This invention provides a method of trimming or slitting strip material on a process line using one or more pairs of trimmer knives mounted for movement laterally to the direction of travel of the strip. The, or each pair of knives are pivotable so as to vary the angle $\alpha$ they make with the centre line of the process line. The lateral position of the strip relative to the lateral position of the trimmers determined and lateral movement of the trimmer is controlled in response to lateral movement of the centre line of the strip, so as to tend to keep the trimmer and strip in constant relationship.

The lateral speed $V_T$ of the or each pair of trimmer knives and the longitudinal speed $V$ or the strip are determined, and the pivotal movement of the or each pair of knives is controlled such that the angle $\alpha$ tends to equal a required angle of $TAN^{-1}(V_T/V)$ or any approximation thereto, so that the or each pair of knives remains substantially parallel to the line of cut made in the strip.

According to another aspect the invention provides an edge trimming device for slitting or trimming the edge of strip material on a process line. A sub-base is arranged for movement transversely to the process line and the strip material and has associated means for moving the sub-base. A base is pivotally mounted on the sub-base and has means for pivotally moving the base. One or more pairs of trimmer knives are arranged on the base for edge trimming the strip and these are means for determining the lateral position of the strip relative to the lateral position of the trimming device. In addition, means responsive to the determined, relative lateral position of the strip controls the sub-base moving means so that lateral movement of the trimmer varies with lateral movement of the centre line of the strip to keep the trimmer and strip in constant relationship. Means for determining the longitudinal speed $V$ of the strip and the lateral speed $V_T$ of the or each pair of trimmer knives is associated with means for controlling the base pivoting means so as to vary the angle $\alpha$ the or each pair of knives make with the centre line of the process line such the angle tends to equal a required angle of $\tan^{-1}(V_T/V)$ or any approximation thereto, and so that the or each pair of knives remains substantially parallel to the line of cut made in the strip.

The pivot point may be centrally arranged or it may be elsewhere on the sub-base. If the pivot point is at one end of the sub-base then the movement angularly of the sub-base which produces the angular movment of the knives may be effected by a piston cylinder arrangement or any similar operating device located at the other end of the sub-base.

BRIEF DESCRIPTION OF THE DRAWINGS

FIG. 1 is a plan view of a trimming device adapted for carrying out the method of this invention;

FIG. 2 is an elevation of the same trimming device;

FIG. 3 is a view in the direction of the arrows X—X shown in FIG. 2;

DETAILED DESCRIPTION

Figure 4:
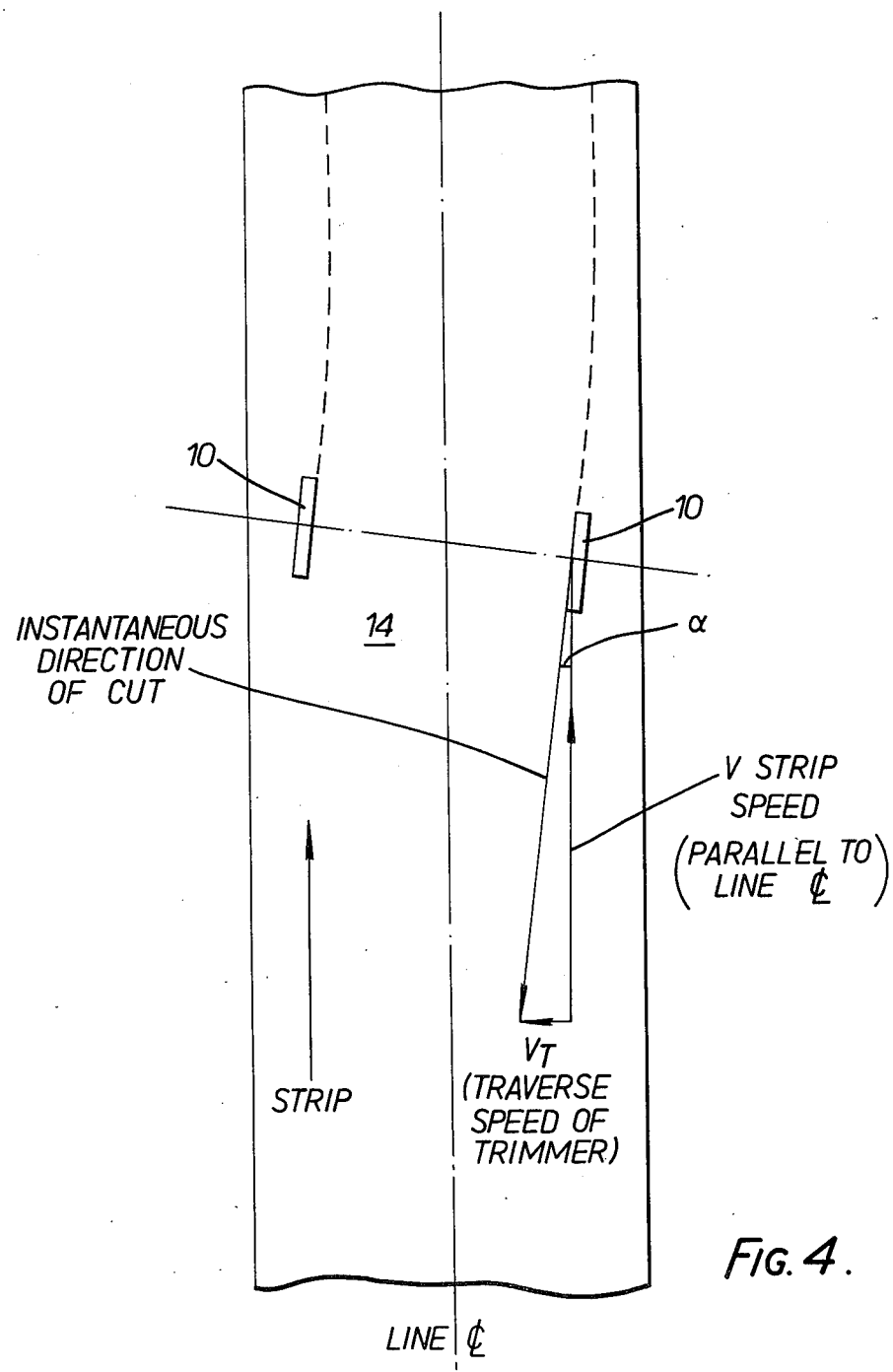
FIG. 4 is a diagrammatic plan view of the strip and the trimmer knives showing the angle of movement of the trimmer knives.

In the embodiment shown in FIGS. 1 to 3 the trimmer device has two spaced pairs of knives of conventional form, the knives being undriven. If driven knives are required motor drives can be added, these motor drives being mounted on the sub-base 3 and driving through flexible shafts.

The pairs of trimmer knives 2 are mounted in trimmer heads 1 and the heads 1 are in turn mounted on a base 3.

The distance between the knives can be adjusted by means of a screw 6 driven by motor 7 in order to set the trimmer width of the strip. The base 3 is pivoted at 11, at one end on a sub-base 4. A hydraulic jack 8 controls the angular position ($\alpha$) of the trimmer heads and therefore the knives.

The sub-base 4 is slidable on a fixed member 5 and its lateral position relatively to the strip 14 is controlled by a hydraulic jack 9.

Figure 7:
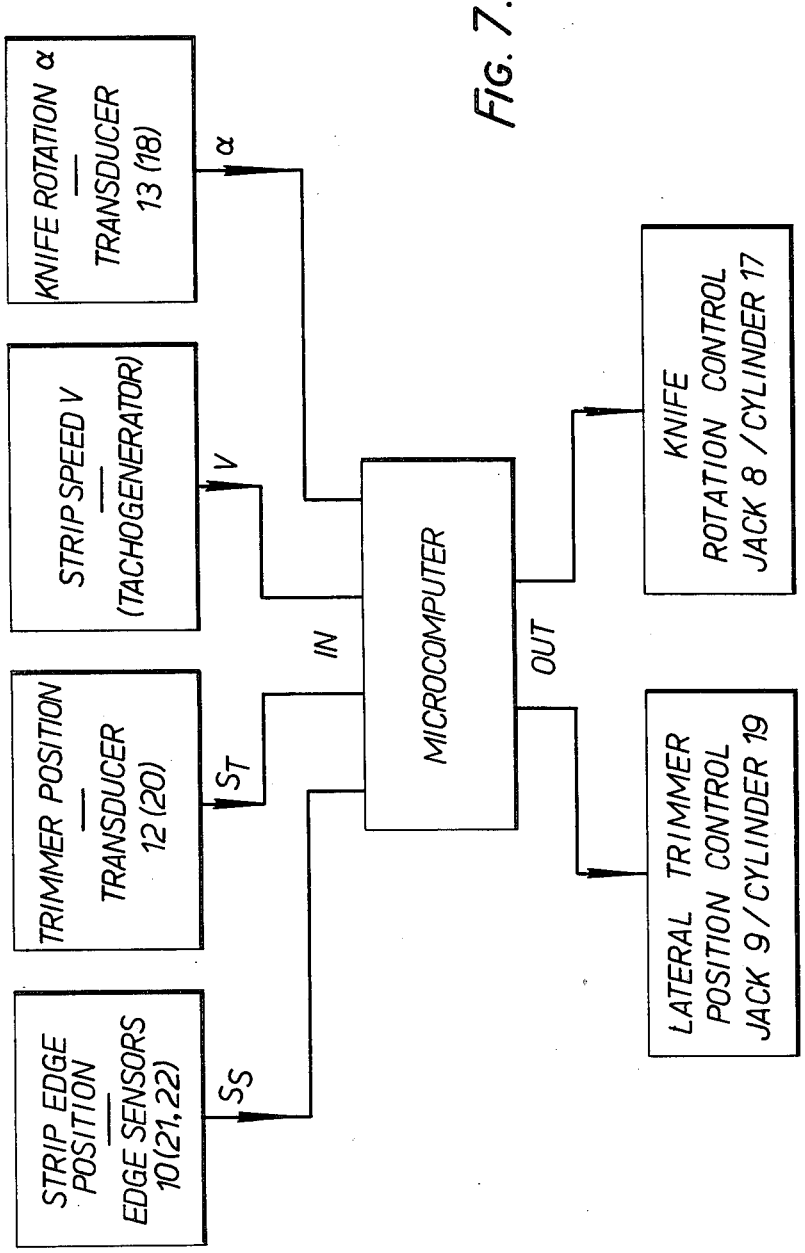
FIG. 7 is a schematic view of a control arrangement for this invention.

The centre line 15 is the centre line of the process line as a whole. The position of the centre line of the incoming strip 14 is determined relative to a fixed datum by means of a conventional system of edge sensors 10 (e.g. lasers and photocells). Edge sensors are provided at each side of the strip and the mean reading from these in effect determines the position of the strip centre line relative to the datum centre line 15 for the strip processing line itself. The signal of strip position is stored in a micro-computer (FIG. 7).

The position of the centre line of the trimmer is determined relative to the centre line 15 of the process line by means of a conventional linear transducer 12. The position signal for the trimmer is also stored in a micro-computer.

The micro-computer is programmed to rapidly compare the two signals and any difference in the two (the "error" signal) is used to control movement of the trimmer by hydraulic jack 9 which moves the trimmer so that its centre line coincides with the strip centre line. Such a general method of position control is well known. The trimmer merely follows the lateral position of the strip.

However, it is not practicable to move the trimmer knives sideways against the strip because sideways forces between the knives and the strip would cause damage to the knives and the cut edge of the strip. The trimmer head with their knives are therefore angularly displaced or rotated slightly in plan when the trimmer is being moved sideways so that the knives are at all times parallel to the line of cut made in the strip and this avoids sideways forces on the knives. As described above, the trimmer heads are mounted on a sub-base 3 which is pivotally mounted on a sub-base 4 around pivot 11. Angular displacement of the trimmer and the knives is controlled by movement of hydraulic jack 8 and the amount of such displacement at rotation $\alpha$ of the knives is in effect determined by the linear transducer 13. A continuous signal of displacement $\alpha$ is fed to the micro-computer and compared with a required angle of displacement which is entirely determined by the speed of the strip relative to the trimmer, and the direction and speed of traverse of the trimmer. The micro-computer is pre-programmed to determine the required angle of displacement from the following relationship $$V_{T/V} = \tan \alpha$$

$$\alpha = \mathrm{TAN}^{-1}(V_{T/V})$$

FIG. 4 shows the path of the knife along the strip when the knives are set at angle $\alpha$ and strip speed is $V$ and traverse speed of the trimmer is $V_T$.

The micro-computer is continuously fed with the following information (a) Strip speed $V$ which is determined in a conventional manner by use of output signals from a digital tachgenerator.

(b) Strip position from conventional edge sensors.

(c) Knife angle displacement $\alpha$ as determined by conventional linear transducer.

(d) Lateral position of the trimmer determined by conventional linear transducer.

The micro-computer is pre-programmed to determine (from the way in which the lateral position of the trimmer is changing instantaneously) the speed of sideways movement of the trimmer and in effect the micro-computer will check also control the angular displacement $\alpha$ of the trimmer heads in accordance with the above expression. The micro-computer will also check and control the lateral position of the trimmer to ensure it is in line with respect to the centre line of the strip.

For most practical purposes the value of $\alpha$ will rarely exceed 1° although the machine could work at larger angles. Nevertheless, it is clear that $\alpha$ is small and that only small angular displacement of the trimmer heads is required. The speed of response of the micro-computer and control system is such that the value of $\alpha$ is accurately matched to strip speed $V$ and lateral speed $V_T$ of the trimmer at all times.

Figure 5:
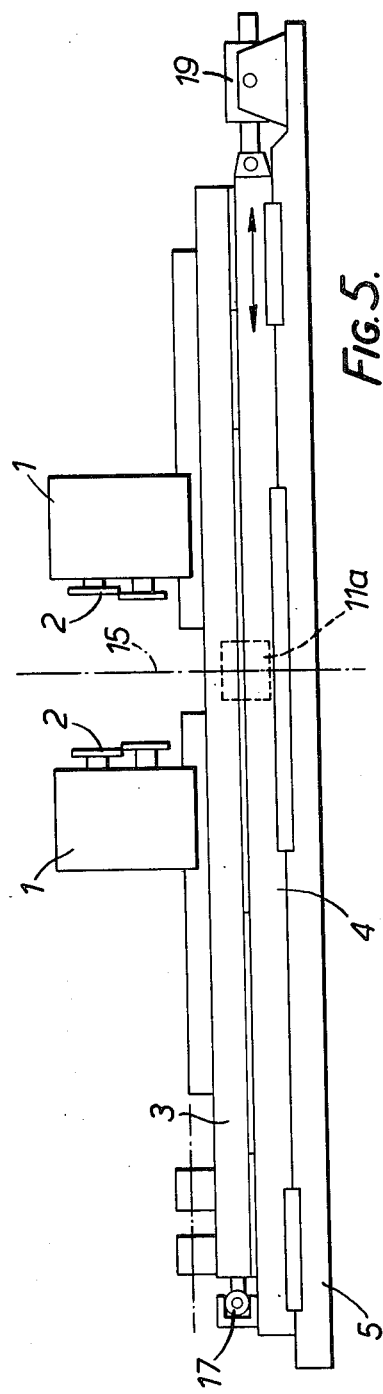
FIG. 5 is a plan view of an alternative form of edge trimming device for use with the method of the present invention.
Figure 6:
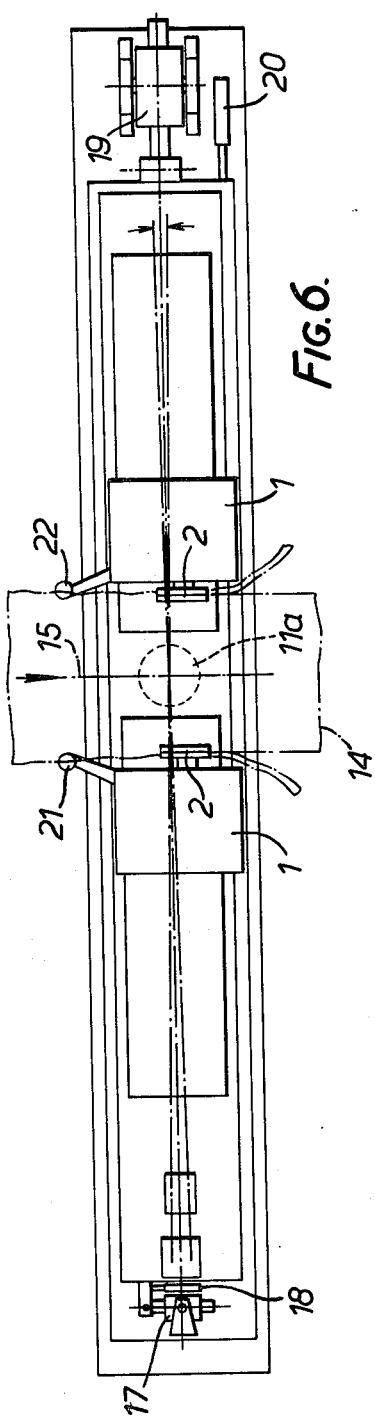
FIG. 6 is an elevation of the same device.

In the alternative form of edge trimmer shown in FIGS. 5 and 6, to which the present method is equally applicable, the heads 1 carrying pairs of trimmer knives 2 are mounted on a skewing base 3 but the pivot 11a instead of being at one end of the base is located centrally.

In this embodiment the skewing of the knives is achieved by means of a hydraulic cylinder 17 and the angle of the knives is measured by transducer 18. The knives are traversed bodily in a lateral direction by a traversing cylinder 19 and the lateral position is measured by a position transducer 10. The position of the two edges of the incoming strip are measured by edge sensors 21, 22.

This embodiment operates in a similar way to the previous embodiment except that the twin edge sensors 21 and 22 are mounted on the trimmer heads so that they measure the position of the strip centre line relative to the centre line of trimmer directly. These sensors detect when the strip moves off the centre line of the trimmer and the signal is fed to the micro-computer which controls hydraulic cylinder 19 to move the trimmer in-line with the strip.

Instead of using two pairs of knives as shown in each of these embodiment, a single pair of knives may be employed as a slitter or multiplicity of pairs of knives may be employed to provide a plurality of slits so as to divide a strip into a number of narrower strips. It is not necessary to describe these alternative arrangements because well known apparatus can be used including apparatus such as was described in our earlier patent application quoted above.

As another alternative each head supporting the knives may be directly pivoted on the sub-base. The heads would then constitute the base and would be linked together so that a hydraulic cylinder or the like angularly displacing or rotating one of the heads would cause both heads to be displaced in parallel by the angle $\alpha$ from the centre line of the process line. With such an arrangement the effective pivot point could be arranged to be aligned with intersection of the cutting edge knives and the strip.

The various functions carried out by the micro-computer are summarised in the following tables. Table 1 relates to FIGS. 1 to 4 and Table 2 relates to FIGS. 2, 5 and 6.

TABLE I (FIGS. 1 TO 4)

| MEASUREMENT | SYMBOL | MICROCOMPUTER CONTROL |
|---|---|---|
| STRIP SPEED (TACHOMETER) | V | (1) ALIGNS ₵ TRIMMER TO ₵ STRIP ($S_T = S_S$) |
| POSITION OF ₵ STRIP RELATIVE TO ₵ PROCESS LINE (EDGE SENSORS) | $S_S$ | (2) DETERMINES TRANSVERSE SPEED OF TRIMMER |
| POSITION OF ₵ TRIMMER RELATIVE TO ₵ PROCESS LINE (TRANSDUCER) | $S_T$ | $\left(V_T = \dfrac{dS_T}{dT}\right)$ (WHERE T = TIME) |
| PIVOT ANGLE OF TRIMMER | α | (3) SETS PIVOT ANGLE OF KNIVES ($\alpha = TAN^{-1} V_T/V$) |

TABLE II

FIGS. 2, 5 AND 6

| MEASUREMENT | SYMBOL | MICROCOMPUTER CONTROL |
|---|---|---|
| STRIP SPEED (TACHOMETER) | V | (1) ALIGNS ₵ TRIMMER TO ₵ STRIP (S = 0) |
| POSITION OF STRIP ₵ RELATIVE TO TRIMMER ₵ (EDGE SENSORS) | S | (2) DETERMINES TRANSVERSE SPEED OF TRIMMER |
| POSITION OF ₵ TRIMMER RELATIVE TO ₵ PROCESS LINE | $S_T$ | $\left(V_T = \dfrac{dS_T}{dT} \text{ WHERE T = TIME}\right)$ |
| PIVOT ANGLE OF TRIMMER | α | (3) SETS PIVOT ANGLE OF KNIVES ($\alpha = TAN^{-1} V_T/V$) |

What is claimed is:

1. A method of trimming or slitting strip material on a process line using one or more pairs of trimmer knives mounted for movement laterally to the direction of travel of the strip, the or each pair of knives being pivotable so as to vary the angle α they make with the centre line of the process line, comprising:

determining the lateral position of the strip relative to the lateral position of the trimmer;

controlling lateral movement of the trimmer in response to lateral movement of the centre line of the strip, so as to tend to keep the trimmer and strip in constant relationship;

determining the lateral speed $V_T$ of the or each pair of trimmer knives, determining the longitudinal speed V or the strip, and controlling the pivotal movement of the or each pair of knives such that the angle α tends to equal a required angle of $TAN^{-1} (V_T/V)$ or any approximation thereto, so that the or each pair of knives remains substantially parallel to the line of cut made in the strip.

2. A method as claimed in claim 1 wherein the angle α made by the or each pair of knives to the process centre line is sensed and compared with the required angle $tan^{-1} (V_T/V)$, and the movement of the or each pair of trimmer knives is controlled in response to that comparison.

3. A method as claimed in claim 2 wherein the relative lateral position of the strip is determined by sensing the position of strip to a fixed datum, sensing the position of the trimmer to the fixed datum, and comparing the sensed positions.

4. A method as claimed in claim 3 wherein the fixed datum is the centre line of the process line.

5. A method as claimed in claim 2 wherein the relative lateral position of the strip is determined by sensing the position of the strip relative to the trimmer directly.

6. An edge trimming device for slitting or trimming the edge of strip material on a process line, comprising: a sub-base arranged for movement transversely to the process line and strip material; means for moving the sub-base; a base pivotally mounted on the sub-base; means for pivotally moving the base; one or more pairs of trimmer knives arranged on the base for edge trimming the strip; means for determining the lateral position of the strip relative to the lateral position of the trimming device; means responsive to the determined, relative lateral position of the strip for controlling the sub-base moving means so that lateral movement of the trimmer varies with lateral movement of the centre line of the strip, to keep the trimmer and strip in constant relationship; means for determining the longitudinal speed V of the strip; means for determining the lateral speed $V_T$ of the or each pair of trimmer knives; and means for controlling the base pivoting means so as to vary the angle α the or each pair of knives make with the centre line of the process line such the angle α tends to equal a required angle of $tan^{-1} (V_T/V)$ or any approximation thereto, and thereby that the or each pair of knives remains substantially parallel to the line of cut made in the strip.

* * * * *